(12) United States Patent
Gordon et al.

(10) Patent No.: US 8,997,164 B2
(45) Date of Patent: Mar. 31, 2015

(54) AUTHORIZING DEVICES BASED ON IDENTIFYING CONTENT DISTRIBUTOR

(71) Applicant: Gracenote, Inc., Emeryville, CA (US)

(72) Inventors: Donald F. Gordon, Mountain View, CA (US); Markus K. Cremer, Orinda, CA (US); Peter Dunker, Berkeley, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

(21) Appl. No.: 13/826,606

(22) Filed: Mar. 14, 2013

(65) Prior Publication Data
US 2014/0196077 A1    Jul. 10, 2014

Related U.S. Application Data

(60) Provisional application No. 61/749,524, filed on Jan. 7, 2013.

(51) Int. Cl.
| | | |
|---|---|---|
| *H04N 7/173* | (2011.01) | |
| *H04N 21/8358* | (2011.01) | |
| *H04N 21/2743* | (2011.01) | |
| *H04N 21/442* | (2011.01) | |

(52) U.S. Cl.
CPC ....... *H04N 21/8358* (2013.01); *H04N 21/2743* (2013.01); *H04N 21/44209* (2013.01)
USPC ............................................ 725/105; 725/31

(58) Field of Classification Search
CPC ..................... H04N 21/23892; H04N 21/8358
USPC ......................................................... 725/14
See application file for complete search history.

(56) References Cited

U.S. PATENT DOCUMENTS

| | | | |
|---|---|---|---|
| 7,797,249 B2 | 9/2010 | Schmelzer | |
| 7,917,645 B2 | 3/2011 | Ikezoye | |
| 8,150,096 B2 | 4/2012 | Alattar | |
| 8,185,733 B2 | 5/2012 | Schwartz et al. | |
| 2012/0117584 A1* | 5/2012 | Gordon | 725/19 |
| 2013/0052939 A1* | 2/2013 | Anniballi et al. | 455/3.01 |
| 2013/0205330 A1* | 8/2013 | Sinha et al. | 725/28 |
| 2013/0212609 A1* | 8/2013 | Sinha et al. | 725/19 |
| 2013/0326573 A1* | 12/2013 | Sharon et al. | 725/115 |
| 2014/0059587 A1* | 2/2014 | Davis et al. | 725/32 |
| 2014/0082655 A1* | 3/2014 | Moon et al. | 725/27 |

FOREIGN PATENT DOCUMENTS

WO    WO-2014107311 A1    7/2014

OTHER PUBLICATIONS

"International Application Serial No. PCT/US2013/076201, International Search Report mailed Apr. 15, 2014", 2 pgs.
"International Application Serial No. PCT/US2013/076201, Written Opinion mailed Apr. 15, 2014", 6 pgs.

* cited by examiner

*Primary Examiner* — Junior Mendoza
(74) *Attorney, Agent, or Firm* — Schwegman Lundberg & Woessner, P.A.

(57) ABSTRACT

Methods and systems to authorize devices and/or perform other actions based on identifying content distributors are described. In some example embodiments, the methods and systems access video content playing at a client device, calculate fingerprints of a portion of the video content, identify a distributor of the video content based on the fingerprints, and perform an action in response to the identification of the distributor of the video content, such as actions to authorize the client device or other associated devices (e.g., second screens) to receive content from the distributor, actions to present sponsored content to the client device or associated devices, and so on.

18 Claims, 5 Drawing Sheets

AUTHORIZING DEVICES BASED ON IDENTIFYING CONTENT DISTRIBUTOR

CROSS REFERENCE TO RELATED APPLICATIONS

This application claims priority to U.S. Provisional Patent Application No. 61/749,524, filed on Jan. 7, 2013, entitled AUTHORIZING DEVICES BASED ON IDENTIFYING CONTENT DISTRIBUTOR, which is hereby incorporated by reference in its entirety.

TECHNICAL FIELD

The subject matter disclosed herein generally relates to the processing of data. Specifically, the present disclosure addresses systems and methods for authorizing devices based on identifying content distributors.

BACKGROUND

Typically, people consume multimedia content (e.g., audio or video content), such as television shows, advertisements, movies, video clips, and so on, via devices that receive a transmission from a content source. For example, a content distributor (e.g., a cable television provider, Internet, or direct-to-home satellite system) receives content from a broadcaster or content provider (e.g., HBO® or CNN®), a web server (e.g., YouTube®), a peer-to-peer source (e.g., another device), and so on, and streams or otherwise transmits audio and/or video content to various devices capable of presenting the content, such as televisions and associated set-top boxes, satellite receivers, computing and/or mobile devices and associated media players or browsers, and so on.

BRIEF DESCRIPTION OF THE DRAWINGS

Some embodiments are illustrated by way of example and not limitation in the figures of the accompanying drawings.

DETAILED DESCRIPTION

Overview

Example methods and systems for authorizing devices and/or performing other actions based on identifying content distributors are described. In some example embodiments, the methods and systems access video or audio content playing at a client device, calculate fingerprints of a portion of the video or audio content, identify a distributor of the video content based on the fingerprints, and perform an action in response to the identification of the distributor of the video content, such as actions to authorize the client device or other devices (e.g., second screens) associated with the user of the client device to receive content from the distributor, or other source, actions to present sponsored content to the client device or associated devices, and so on.

In some example embodiments, the methods and systems identify a distributor and/or a set or class of distributors, based on determining a time delay associated with a distributor providing video content to a client device, such as time delay between transmission of a frame of video from a distributor and presentation of the same frame of video at a client device, and perform actions in response to the identification of the distributor and/or the set or class of distributors.

The example methods and systems may, therefore, enable content distributors to authorize and/or authenticate users and their associated devices to receive content from the distributor, without requiring the users to provide access credentials or other information, among other things. Thus, the methods and systems may automatically authorize and/or authenticate devices (e.g., first screens, second screens, or further screens) to receive content from a distributor by identifying the distributor providing the content via various techniques.

In the following description, for purposes of explanation, numerous specific details are set forth to provide a thorough understanding of example embodiments. It will be evident to one skilled in the art, however, that the present subject matter may be practiced without these specific details.

Example Network Environment

Figure 1:
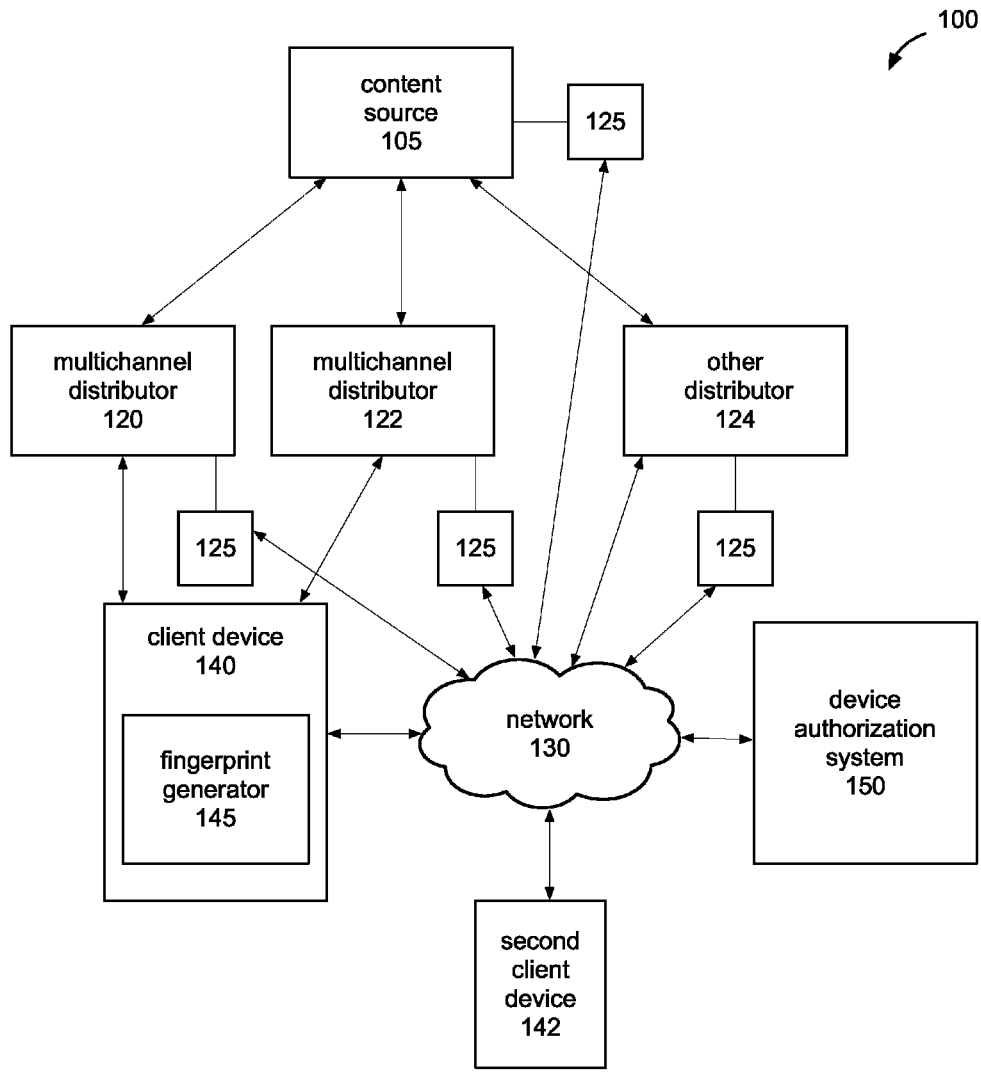
FIG. 1 is a network diagram illustrating a network environment suitable for authorizing devices based on identifying content distributors, according to some example embodiments.

FIG. 1 is a network diagram illustrating a network environment suitable for authorizing devices based on identifying content distributors, according to some example embodiments.

The network environment 100 may include a content source 105 (e.g., a broadcaster, network, a website, and so on), that provides multimedia content, such as video content, to one or more distributors, such as multichannel distributor 120 (e.g., a cable provider), multichannel distributor 122 (e.g., a satellite provider), and/or other distributors 124 (e.g., web-based providers). Example distributors may include national or local cable television systems, direct broadcast satellite systems, wireline video providers, over-the-top (OTT) providers, local broadcasters, and so on, including various combinations thereof.

One or more client devices, such as a primary device or first screen device 140 and/or a secondary device or second screen 142, may receive the video content that originates from the content source 105 via the multichannel distributors 120, 122, or the other distributors 124. For example, the client devices 130, 142 may receive content from the multichannel distributor 120 via a broadcast channel (e.g., a cable channel or satellite connection) and/or over a network 130 such as the Internet. The network 130 may be any network that enables communication between devices and/or distributors 120, 122, 124, such as a wired network, a wireless network (e.g., a mobile network), and so on. The network 130 may include one or more portions that constitute a private network (e.g., a cable television network or a satellite television network), a public network (e.g., over-the-air broadcast channels or the Internet), and so on.

The client devices 140, 142 may include televisions, set-top boxes, laptops and other personal computers, tablets and other mobile devices (e.g., smart phones), gaming devices, and other devices capable of receiving and presenting a stream of video and/or other multimedia content. In some example embodiments, the client devices 140, 142 may include a tuner configured to receive a stream of video content and play the stream of video content by processing the stream and outputting information (e.g., digital or analog) usable by a display of the client devices 140, 142 to present the video content to a user associated with the client devices 140, 142. The client devices 140, 142 may also include a display or other user interface configured to display the processed stream of video content. The display may be a flat-panel screen, a plasma screen, a light emitting diode (LED) screen, a cathode ray tube (CRT), a liquid crystal display (LCD), a projector, and so on.

The client devices 140, 142 may be associated in a number of ways. For example, they may be associated with a single or similar subscriber, they may be located on the same network, such as network 130, they may be at the same location, and so on.

One or more watching stations 125 may be located at the content source 105 and/or the distributors 120, 122, 124. A watching station 125 may receive video and other multimedia content from a content source 105 or a distributor, such as a broadcaster, web server, and so on, and include various systems configured to identify content being transmitted, received, and/or broadcast by the content source 105 and/or the distributors 120, 122, 124. For example, the watching stations 125 may include a reference fingerprint generator (e.g., a component that calculates a hash value from a portion of video content) that is configured to generate reference fingerprints or other identifies of received video content and/or a timing system that is configured to measure and/or track a time at which content (e.g., one or more frames of content) is transmitted and/or received, among other things.

The client devices, such as client device 140, may include a query fingerprint generator 145 that is configured to capture and/or generate query fingerprints of a frame or block of frames of video content, such as video content playing at the client device 140.

In some example embodiments, a device authorization system 150 communicates with the watching stations 125 and the client devices 140, 142 over the network 130. The device authorization system 150 may include components configured to perform various actions, such as authorize and/or authenticate the client devices 140, 142 to receive certain content, based on identifying the distributor 120, 122, 124 that is providing content to the client device 140. For example, the device authorization system 150 may include components configured to query a database of known reference fingerprints, such as fingerprints generated by the watching stations 125, in order to identify the distributor of the video content and/or the source of the video content, among other things.

For example, the device authorization system 150 may compare fingerprints captured by the client device 140 to fingerprints captured at various watching stations 125, and determine that the client device 140 is currently receiving video content from multichannel distributor 120, which is a specific cable television provider. Based on the identification, the device authorization system 150 authorize the client device 140 to receive additional content from the specific cable provider, and authorizes second client device 142, which is associated with the client device 140, to stream video content from the multichannel provider 120, among other things.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 5. As used herein, a "database" is a data storage resource and may store data structured as a text file, a table, a spreadsheet, a relational database, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in the FIG. 1. For example, the device authorization system 150 may include the query fingerprint generator 145, receive frames of video content from the client device 140, and identify the distributor of content based on the received frames of content. As another example, the client device 140 may include and/or incorporate some or all components of the device authorization system 150, among other things.

Examples of Performing Actions Based in Identifying Content Distributors

Figure 2:
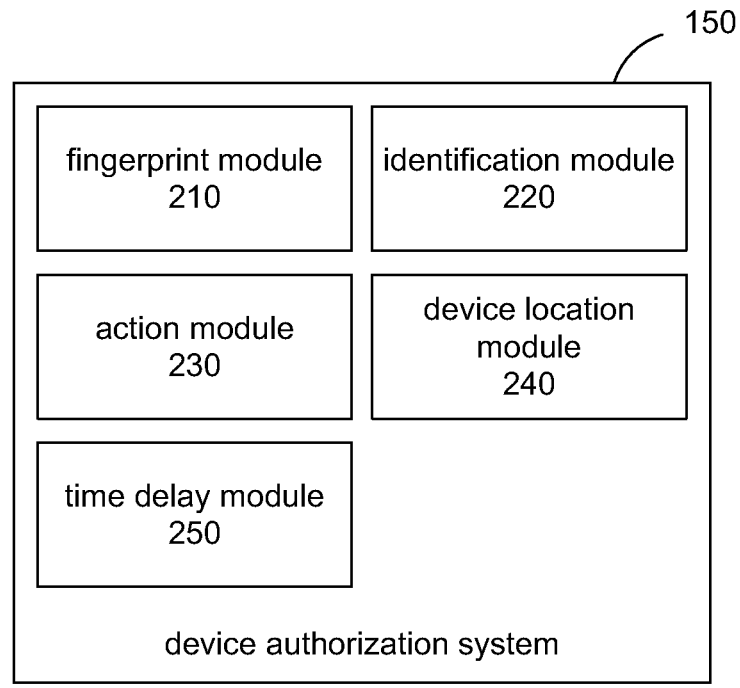
FIG. 2 is a block diagram illustrating components of a device authorization system, according to some example embodiments.

As described herein, in some example embodiments, the systems and methods described herein perform actions in response identifying content distributors, such as authorizing devices to receive content based on identifying distributors of the content using video fingerprint matching, time delay matching, and/or other identification techniques. FIG. 2 is a block diagram illustrating components of the device authorization system 150, according to some example embodiments. The device authorization system 150 may include various modules and/or components, such as a fingerprint module 210, an identification module 220, an action module 230, a device location module 240, and a time delay module 250.

One or more of the modules described herein may be implemented using hardware (e.g., a processor of a machine) or a combination of hardware and software. Moreover, any two or more of these modules may be combined into a single module, and the functions described herein for a single module may be subdivided among multiple modules.

In some example embodiments, the fingerprint module 210 is configured and/or programmed to access, determine, and/or calculate one or more fingerprints of video content playing at a client device. For example, the fingerprint module 210 may capture one or more fingerprints of one or more frames of video content displayed or otherwise presented by the client device 140. The captured fingerprints may be of an entire frame of content, a portion of a frame of content, and so on.

In some example embodiments, the identification module 220 is configured and/or programmed to identify a distributor of the video content based on the one or more captured fingerprints. For example, the identification module 220 may compare fingerprints captured at the client device 140 to fingerprints captured by watching stations 125 at various distributors (e.g., multichannel distributors 120, 122 and other distributor 124), and identify the distributor based on matching the fingerprint captured at the client device 140 to a fingerprint captured by a watching station 125 associated with one of the distributors 120, 122, 124.

In some cases, many different distributors may transmit similar types of video content at the same time, such as live broadcast programming (e.g., live sporting events, scheduled television programming, live steaming events, and so on). For example, a cable provider may provide a live football game to its subscribers at the same time a satellite provider provides the same live football game its subscribers, or two different local affiliates of a network may present the same program at the same time to client devices 120 at different locations.

Therefore, the identification module 220 may capture and/or utilize, for comparison and/or identification purposes, fingerprints of frames of displayed content that may be unique to the specific distributor (e.g., the specific entity providing content to the client device 120) of the video content. Example displayed content that may be unique to a distributor may include the advertisements and/or sponsored content shown during the presentation of video content, a logo or other identifier displayed along with (e.g., via an overlay layer) presented video content, a displayed channel guide or other set-top box interactive content that is provided by the distributor (e.g., the specific display of channel or volume controls), and so on.

Thus, in some example embodiments, the identification module 220 may identify an advertisement provided by a distributor and displayed within the video content by matching the one or more captured fingerprints to one or more reference fingerprints associated with the advertisement that are captured from video content playing at a watching station associated with the distributor. Alternatively, the identification module 220 may identify a distributor of the video content based on one or more captured fingerprints including a logo or other information being displayed with the video content that is associated with the distributor.

In some example embodiments, the action module 230 is configured and/or programmed to perform an action in response to the identification of the distributor of the video content. The action module 230 may authorize or authenticate the client device 140 or the second client device 142, which is associated with the client device 140, to receive video content from the identified distributor of the video content.

For example, the action module 230, in response to identifying the distributor providing video content to the client device 140, may transmit information identifying the client device 140 or second client device 142 to one or more application programmed interfaces (APIs) associated with authorizing devices to receive content from the identified distributor. Thus, the action module 230 may enable the client device 140 to receive additional content from the distributor, such as content that supplements or enhances video content currently playing via the client device 140, and/or may enable the second client device 142 to receive additional content from the distributor, such as content that supplements or enhances video content currently playing via the client device 140, among other things.

In some example embodiments, the action module 230 may perform an action that enables second client device 142 to receive a temporary and/or limited authorization to receive content from an identified distributor. For example, in response to identifying the distributor 122 as providing video content to the client device 140, the action module 230 may authorize the client device 140 to receive video content from the distributor 122 without time restrictions, but authorize the second client device 142 to only access video content from the distributor within a following 24 hour period, among other things.

The action module 230 may perform other actions in response to identifying the distributor of the video content at the client device 140. For example the action module 230 may perform an action that presents a specific advertisement or other sponsored content to the client device 140, an action that presents specific information along with displayed content, and so on.

In some example embodiments, the device location module 240 is configured and/or programmed to identify a location of the client device 140, such as based on receiving information associated with the client device that identifies a location of the client device. The identification module 220 may utilize the identification of the client device 140 to identify the distributor based on a captured fingerprint and based on the information identifying the location of the client device 140.

For example, the device location module 240 may identify the location of the client device 240 based on network information, geolocation information (e.g., GPS information) provided by the device, subscriber information, and so on. The identification module 220 may utilize such information in order to identify a specific location associated with the distributors 120, 122, 124. For example, using the location information, the action module 230 may be able to perform location-based actions that are associated with the identified distributor and the identified location of the client device 140, such as location-based advertisements, location-based content access and authentication (e.g., regional sports programming), and so on. Thus, in some example embodiments, the device authorization system 150 may perform one subset of actions associated with an identified distributor of video content based on a location of a client device 140, among other things.

In some example embodiments, the device authorization system 150 may utilize other characteristics, distinguishing aspects, or information when identifying a specific distributor 120, 122, 124 of video content playing at the client device 140. For example, the time delay module 250 is configured and/or programmed to determine a time delay between a first time associated with a transmission of a frame of video content from a content provider 105 to a distributor 120, 122, 124 of the video content and a second time associated with a presentation of the frame of video content by the distributor 120, 122, 124 via a client device 140.

In some example embodiments, the time delay module 250 may determine a time at which the distributor 120, 122, 124 receives the frame of video content, may determine a time at which the client device 140 presents the frame of video content, and calculate the different between the second time and first time. The time delay module 250 or the identification module 220 may compare the determined or calculated time delay to known time delays associated with the distributors 120, 122, 124, and identify the distributor that is associated with a time delay that matches the calculated time delay.

Figure 3:
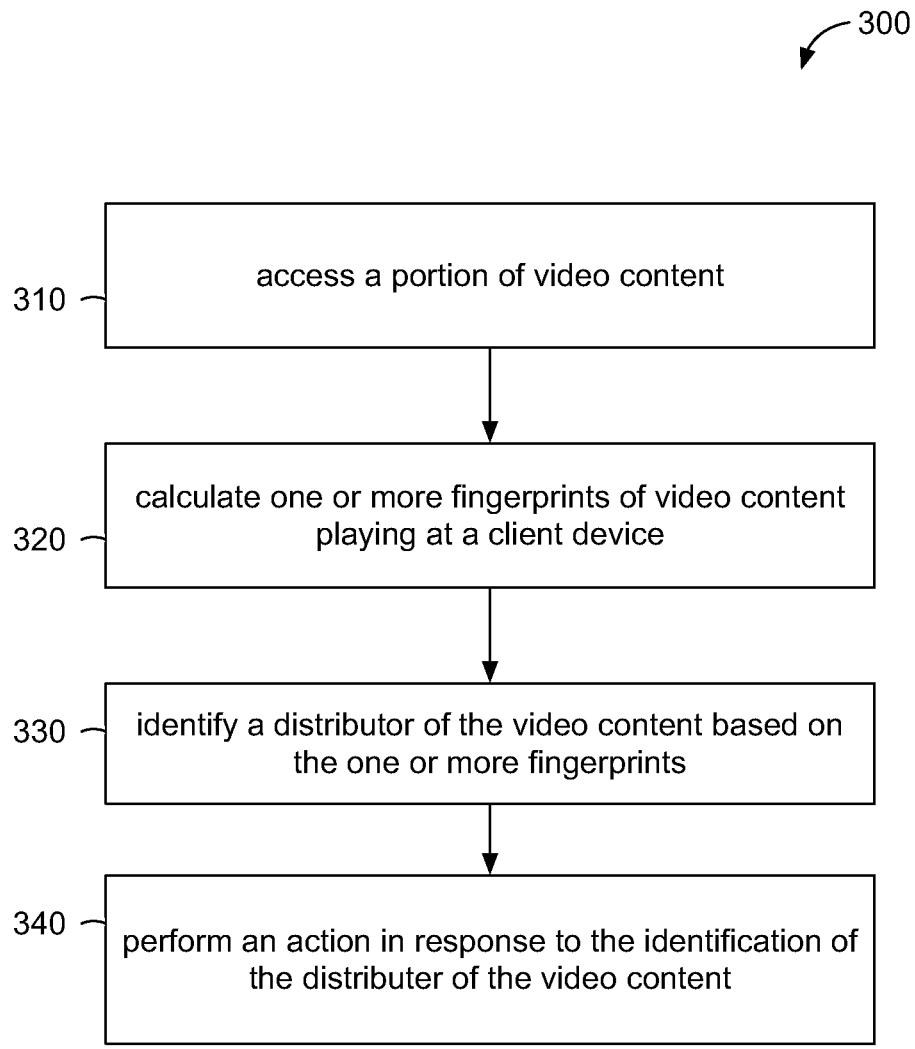
FIG. 3 is a flow diagram illustrating an example method for performing an action based on identifying a content distributor using fingerprints of video content, according to some example embodiments.

As described herein, the device authorization system 150 may perform various methods in order to perform actions in response to identifying a distributor 120, 122, 124 of content playing at the client device 140, among other things. FIG. 3 is a flow diagram illustrating an example method 300 for performing an action based on identifying a content distributor using fingerprints of video content, according to some example embodiments. The method 300 may be performed by the device authorization system 150 and, accordingly, is described herein merely by way of reference thereto. It will be appreciated that the method 300 may be performed on any suitable hardware.

In operation 310, the device authorization system 150 accesses a portion of video content, such as video content playing at the client device 140. For example, the fingerprint module 210 accesses a portion of content playing at the client device 140.

In some example embodiments, the device authorization system 150 may directly access the portion of video content 150 via the client device 140, such as by accessing a cache or data store associated with the portion of video content, among other things. In some example embodiments, the device authorization system 150 may access images of the portion of video content, such as images taken or captured by imaging components (e.g., cameras) of the client device 140 and/or the second client device 142, among other things.

In operation 320, the device authorization system 150 calculates and/or otherwise determines one or more fingerprints of video content playing at a client device. For example the fingerprint module 210 calculates hash values or other identifies of a frame or block of frames of the portion of video content.

In operation 330, the device authorization system 150 identifies a distributor of the video content based on the one or more captured fingerprints. For example, the identification module 220 identifies a specific distributor 120, 122, or 124 based on a match of one of the captured fingerprints to reference fingerprints captured by watching stations 125 associated with the distributors 120, 122, 124 of the video content. Example distributors that may be identified include multi-channel distributors (cable or satellite content providers), wireline or web-based content providers, OTT providers, and so on.

For example, the device authorization system 150 may identify an advertisement provided by the distributor 120, 122, 124 and displayed by the video content by matching the one or more captured fingerprints to one or more reference fingerprints associated with the advertisement that are captured from video content playing at a watching station associated with the distributor.

As another example, the device authorization system 150 may identify a distributor 120, 122, 124 of the video content based on identifying with the captured fingerprints of one or more frames of the video content a logo or other information displayed with the video content that is associated with the distributor.

In some example embodiments, the device authorization system 150 may receive information identifying a location of the client device (e.g., network or GPS information) and identify the distributor based on captured fingerprints and the received information identifying the location of the client device.

In operation 340, the device authorization system 150 performs an action in response to the identification of the distributor of the video content. For example, the action module 230 may perform an action associated with the identified distributor 120, 122, or 124 of the video content, and, optionally, the identified location of the client device 140.

For example, the action module 230 may authorize, or cause to be authorized, the client device 140 to receive additional video content from the identified distributor 120, 122, or 124 of the video content, and/or may authorize, or cause to be authorized, the second client device 142 associated with the client device to receive video content from the identified distributor 120, 122, or 124 of the video content.

As another example, the action module 230 may perform an action associated with displaying sponsored content (such as advertisements, messages, and so on) based on the identified distributor of the video content, and/or may perform an action associated with displaying supplemental content (such as information or metadata associated with a currently playing program) based on the identified distributor of the video content, among other things.

Figure 4:
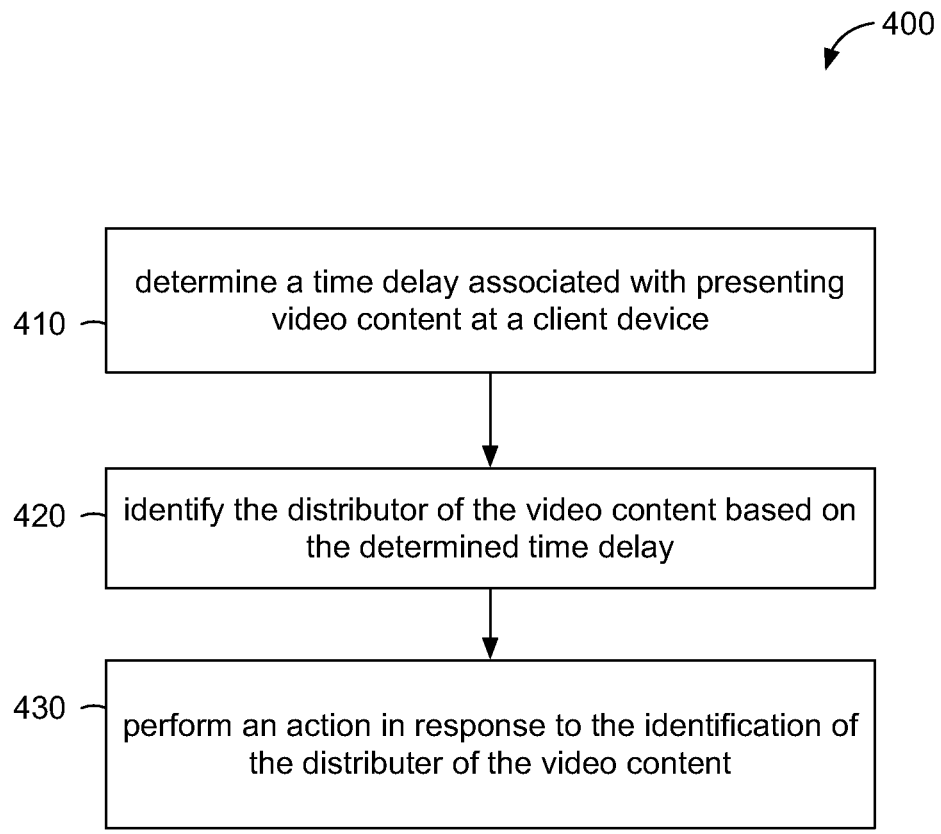
FIG. 4 is a flow diagram illustrating an example method for performing an action based on identifying a content distributor using time delay information, according to some example embodiments.

As described herein, in some example embodiments, the device authorization system 150 may utilize certain characteristics associated with the distribution of content in order to identify a distributor of content, among other things. FIG. 4 is a flow diagram illustrating an example method 400 for performing an action based on identifying a content distributor using time delay information, according to some example embodiments. The method 400 may be performed by the device authorization system 150 and, accordingly, is described herein merely by way of reference thereto. It will be appreciated that the method 400 may be performed on any suitable hardware.

In operation 410, the device authorization system determines a time delay between a first time associated with a transmission of a frame of video content from a content provider to a distributor of the video content and a second time associated with a presentation of the frame of video content by the distributor via a client device. For example, the time delay module 250 may determine a time at which the distributor 120, 122, 124 receives the frame of video content, may determine a time at which the client device 140 presents the frame of video content, and calculate the different between the second time and first time.

In operation 420, the device authorization system 150 identifies the distributor of the video content based on the determined time delay. For example, the time delay module 250 or the identification module 220 may compare the determined or calculated time delay to known time delays associated with the distributors 120, 122, 124, and identify the distributor that is associated with a time delay that matches the calculated time.

In operation 430, the device authorization system 150 performs an action in response to the identification of the distributor of the video content. For example, the action module 230 may authorize or facilitate authorization of the client device 140 and/or the second client device 142 to access or temporarily access content from the identified distributor, among other things.

Thus, in some example embodiments, the device authorization system 150 described herein facilitates the automatic authorization of various devices (e.g., first or second screens) that are associated with a subscriber of a content distributor to access content provided by the content distributor, among other benefits.

For example, the device authorization system 150 may determine that a client device 140 is currently playing content provided by a specific cable provider, and authorize a second client device 142 associated with the client device 140 to stream content from the specific cable provider's online steaming service, among other things.

Figure 5:
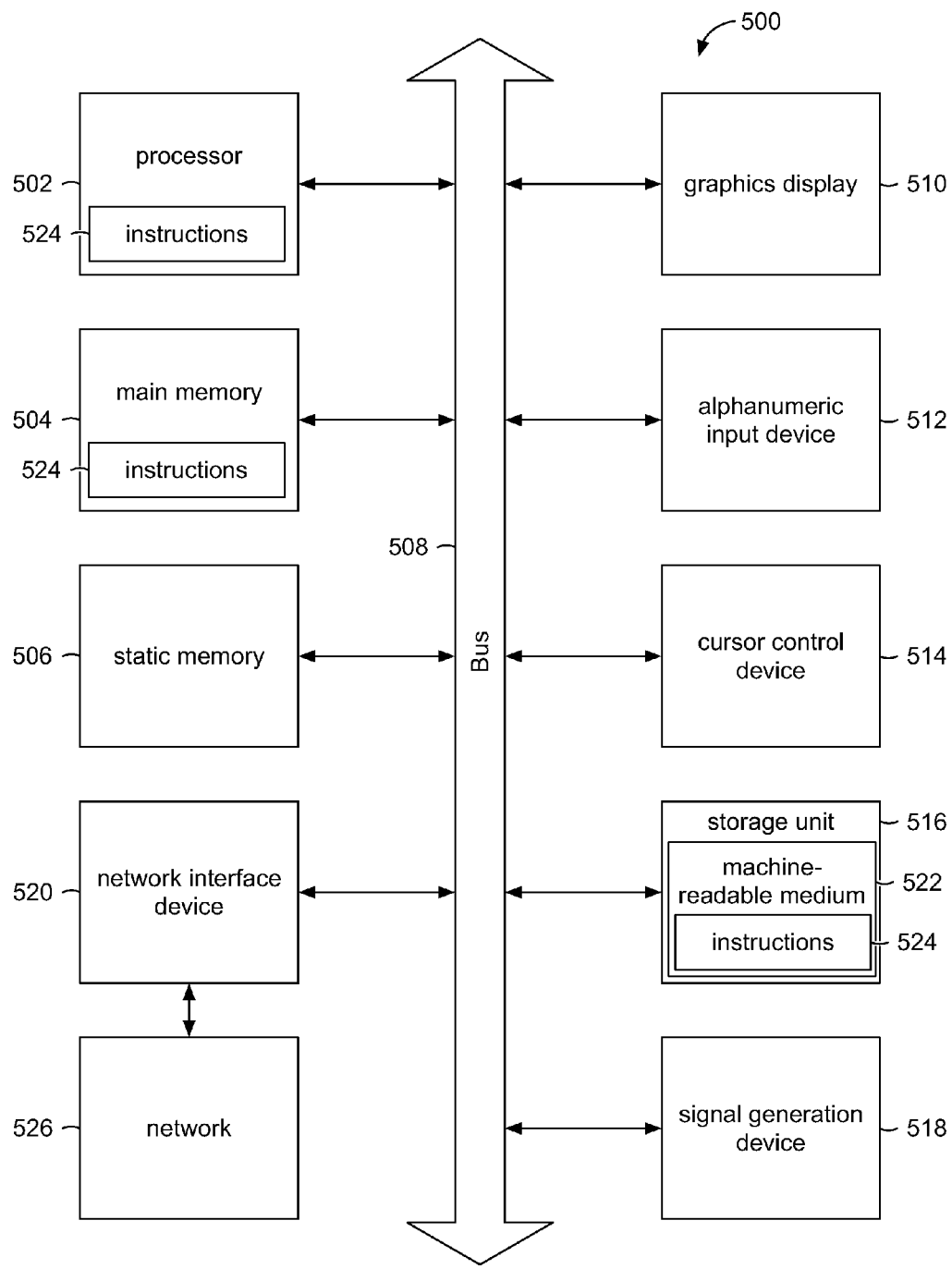
FIG. 5 is a block diagram illustrating components of a machine, according to some example embodiments, able to read instructions from a machine-readable medium and perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system and within which instructions 524 (e.g., software) for causing the machine 500 to perform any one or more of the methodologies discussed herein may be executed. In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer, a tablet computer, a laptop computer, a netbook, an set top box, a personal digital assistant, a cellular telephone, a smartphone, a web appliance, a network router, a network switch, a network bridge, or any machine capable of executing the instructions 524 (sequentially or otherwise) that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a graphics display 510 (e.g., a plasma display panel (PDP), an LED display, an LCD, a projector, or a CRT). The machine 500 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and a network interface device 520.

The storage unit 516 includes a machine-readable medium 522 on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, during execution thereof by the machine 500. Accordingly, the main memory 504 and the processor 502 may be considered as machine-readable media. The instructions 524 may be transmitted or received over a network 526 (e.g., network 190) via the network interface device 520.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., software) for execution by the machine (e.g., machine 500), such that the instructions, when executed by one or more processors of the machine (e.g., processor 502), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output.

Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

accessing multiple video streams, each video stream being distributed by a different content distribution system among multiple content distribution systems, each video stream including same video content provided by a single content source to the multiple content distribution systems and including different distributor-specific content that is unique to the corresponding content distribution system that distributes the video stream, the multiple video streams being available from the multiple content distribution systems to each of a plurality of client devices;

for each of the multiple video streams:
    generating a set of reference fingerprints of the distributor-specific content included within the video stream accessed from the corresponding content distribution system; and
    associating the set of reference fingerprints with the corresponding content distribution system that distributes the video stream;

accessing a set of query fingerprints received from a client device among the plurality of client devices, the set of query fingerprints being calculated from at least a portion of the distributor-specific content playing at the client device;

querying a reference database that includes the sets of reference fingerprints to identify a set of reference fingerprints that corresponds to the set of query fingerprints;

identifying a content distribution system among the multiple content distribution systems and associated with the set of reference fingerprints that corresponds to the set of query fingerprints thereby to identify the content distribution system providing the video stream to the client device;

otherwise, identifying a content distribution system among the multiple content distribution systems by determining a time delay between a first time associated with a transmission of a frame of video content from the single content source to the content distribution system and a second time associated with a presentation of the frame of video content by the content distribution system via the client device; and performing an action dependent upon the identifying of the content distribution system providing the video stream to the client device.

2. The method of claim 1, wherein the performing of the action includes authorizing the client device to receive additional video content from the identified content distribution system.

3. The method of claim 1, wherein the performing of the action includes authorizing a second client device associated with the client device to receive the video stream from the identified content distribution system.

4. The method of claim 1, wherein the performing of the action includes providing sponsored content that is associated with the identified content distribution system.

5. The method of claim 1, wherein the performing of the action includes providing supplemental content associated with the video stream to a second device associated with the client device.

6. The method of claim 1, wherein the video stream playing at the client device includes an advertisement as the distributor-specific content unique to the corresponding content distribution system; and the querying of the reference database to identify the set of reference fingerprints identifies one or more reference fingerprints of the advertisement.

7. The method of claim 1, wherein the video stream playing at the client device includes a logo of the content distribution system providing the video stream to the client device; and the querying of the reference database to identify the set of reference fingerprints identifies one or more reference fingerprints of the logo.

8. The method of claim 1, further comprising:
receiving information that identifies a location of the client device; and
wherein the identifying of the content distribution system is based on the received information that identifies the location of the client device.

9. The method of claim 1, wherein the identifying of the content distribution system includes identifying a multichannel distributor that receives the video stream from the single content source and provides the video stream to the client device.

10. The method of claim 1, wherein the identifying of the content distribution system includes identifying at least one of a cable television system, a direct broadcast satellite system, or a wireline video provider of the video stream.

11. The method of claim 1, wherein the identifying of the content distribution system includes identifying an over-the-top content provider.

12. The method of claim 1, wherein:
the video stream playing at the client device includes an advertisement as the distributor-specific content unique to the corresponding content distribution system; and
the identification module, in being configured to query the reference database to identify the set of reference fingerprints, is configured to identify one or more reference fingerprints of the advertisement.

13. The method of claim 1, wherein:
the video stream playing at the client device includes a logo of the content distribution system providing the video stream to the client device; and
the identification module, in being configured to query the reference database to identify the set of reference fingerprints, is configured to identify one or more reference fingerprints of the logo.

14. The method of claim 1, wherein:
the video stream playing at the client device includes a video frame that is unique to the content distribution system providing the video stream to the client device; and
the identification module, in being configured to query the reference database to identify the set of reference fingerprints, is configured to identify one or more reference fingerprints of the video frame.

15. A system comprising:
a set of watching stations each configured to:
access a video stream being distributed by a content distribution system among multiple content distribution systems, the video stream including same video content provided by a single content source to the multiple content distribution systems and including distributor-specific content that is unique to the corresponding content distribution system that distributes the video stream, the multiple video streams being available from the multiple content distribution systems to each of a plurality of client devices;
generate a set of reference fingerprints of the distributor-specific content included within the video stream accessed from the corresponding content distribution system; and
associate the set of reference fingerprints with the corresponding content distribution system that distributes the video stream;
an identification module that is configured to:
access a set of query fingerprints received from a client device among the plurality of client devices, a set of query fingerprints being calculate from at least a portion of the distributor specific content playing at the client device;
query a reference database that includes the sets of reference fingerprints to identify a set of reference fingerprints that corresponds to the set of query fingerprints;
identify a content distribution system among the multiple content distribution systems and associated with the set of reference fingerprints that corresponds to the set of query fingerprints thereby to identify the content distribution system providing the video stream to the client device; and
otherwise, identify a content distribution system among the multiple content distribution systems by determining a time delay between a first time associated with a transmission of a frame of video content from the single content source to the content distribution system and a second time associated with a presentation of the frame of video content by the content distribution system via the client device; and
an action module that is configured to perform an action dependent upon the identifying of the content distribution system providing the video stream to the client device.

16. The system of claim 15, wherein the action module is configured to authorize a second device associated with the client device to receive the video content from the identified content distribution system.

17. The system of claim 15, further comprising:
a device location module that is configured to identify a location of the client device based on receiving information that identifies a location of the client device; and
wherein the identification module is configured to identify the content distribution system based on the received information that identifies the location of the client device.

18. A non-transitory machine-readable storage medium comprising instructions that, when executed by one or more processors of a machine, cause the machine to perform operations comprising:
accessing multiple video streams, each video stream being distributed by a different content distribution system among multiple content distribution systems, each video stream including same video content provided by a single content source to the multiple content distribution systems and including different distributor-specific content that is unique to the corresponding content distribution system that distributes the video stream, the multiple video streams being available from the multiple content distribution systems to each of a plurality of client devices;
for each of the multiple video streams:
generating a set of reference fingerprints of the distributor-specific content included within the video stream accessed from the corresponding content distribution system; and associating the set of reference fingerprints with the corresponding content distribution system that distributes the video stream;

accessing a set of query fingerprints received from a client device among the plurality of client devices, the set of query fingerprints being calculated from at least a portion of the distributor-specific content playing at the client device;

querying a reference database that includes the sets of reference fingerprints to identify a set of reference fingerprints that corresponds to the set of query fingerprints;

identifying a content distribution system among the multiple content distribution systems and associated with the set of reference fingerprints that corresponds to the set of query fingerprints thereby to identify the content distribution system providing the video stream to the client device;

otherwise, identifying a content distribution system among the multiple content distribution systems by determining a time delay between a first time associated with a transmission of a frame of video content from the single content source to the content distribution system and a second time associated with a presentation of the frame of video content by the content distribution system via the client device; and performing an action dependent upon the identifying of the content distribution system providing the video stream to the client device.

* * * * *

UNITED STATES PATENT AND TRADEMARK OFFICE
CERTIFICATE OF CORRECTION

PATENT NO. : 8,997,164 B2
APPLICATION NO. : 13/826606
DATED : March 31, 2015
INVENTOR(S) : Gordon et al.

Page 1 of 1

It is certified that error appears in the above-identified patent and that said Letters Patent is hereby corrected as shown below:

In the Specification

In column 2, line 52, delete "130," and insert --140,--, therefor

In column 5, line 2, delete "120" and insert --140--, therefor

In column 5, line 7, delete "120" and insert --140--, therefor

In column 6, line 9, delete "240" and insert --140--, therefor

Signed and Sealed this
Fifteenth Day of September, 2015

Michelle K. Lee
*Director of the United States Patent and Trademark Office*